United States Patent [19]

Freeman

[11] Patent Number: 5,536,286
[45] Date of Patent: Jul. 16, 1996

[54] VACUUM VALVE FILTERING SYSTEM

[76] Inventor: Lewis G. Freeman, 1509 Pontiac Dr., Kokomo, Ind. 46902

[21] Appl. No.: 312,316

[22] Filed: Sep. 26, 1994

[51] Int. Cl.⁶ .................................................. B01D 35/01
[52] U.S. Cl. .......................... 55/322; 55/385.1; 55/485; 55/525; 95/284; 95/287
[58] Field of Search .................. 95/284, 287; 55/385.1, 55/385.4, 469, 485, 486, 525, 322

[56] References Cited

U.S. PATENT DOCUMENTS

| | | | |
|---|---|---|---|
| 3,070,857 | 1/1963 | Venus | 22/73 |
| 3,515,305 | 6/1970 | Weber et al. | 55/385.4 |
| 3,557,536 | 1/1971 | Ririe | 55/485 |
| 3,590,114 | 6/1971 | Uhlig | 264/328 |
| 3,859,067 | 1/1975 | Dasek et al. | 55/485 |
| 3,860,403 | 1/1975 | Aoi | 55/485 |
| 3,953,182 | 4/1976 | Roth | 55/485 |
| 4,027,726 | 6/1977 | Hodler | 164/305 |
| 4,099,904 | 7/1978 | Dawson | 425/563 |
| 4,463,793 | 8/1984 | Thurner | 164/155 |
| 4,577,670 | 3/1986 | Moore | 164/155 |
| 4,680,003 | 7/1987 | Schulte et al. | 425/206 |
| 4,793,922 | 12/1988 | Morton | 55/485 |
| 5,101,882 | 4/1992 | Freeman | 164/457 |

FOREIGN PATENT DOCUMENTS

| | | |
|---|---|---|
| 346361 | 6/1960 | Germany. |
| 57-81949 | 5/1982 | Japan. |
| 58-97478 | 6/1983 | Japan. |

*Primary Examiner*—Jay H. Woo
*Assistant Examiner*—Duane S. Smith
*Attorney, Agent, or Firm*—Christopher A. Taravella

[57] ABSTRACT

A vacuum valve filter system has a plurality of diverting elements sandwiching a plurality of filter elements for filtering fluid passing from a cavity of a vacuum die. The diverter elements establish a serpentine fluid flow through the filter systems. Also, the filter elements are compressible, acting as a stop in the event of an overflow of molten material entering the filter system.

7 Claims, 2 Drawing Sheets

VACUUM VALVE FILTERING SYSTEM

BACKGROUND AND SUMMARY OF THE INVENTION

The present invention relates to vacuum valves and, more particularly, to filter systems coupled with a vacuum valve to protect the vacuum system against an overflow of molten material.

In the vacuum die casting industry, it is desirable to remove air and other gases from the die cavity prior to injection of a molten metal shot which results in improved flow of the molten material into the die cavity which, in turn, produces a casting having improved grain structure and surface finish. Evacuation of the die cavity is generally accomplished by a venting device that is in fluid communication with the die cavity. Also, various types of filter devices may be in the vacuum path to remove contaminants and to prohibit overflow of the molten material.

Accordingly, the present invention is directed to an improved filter system for a vacuum valve for use in a vacuum die casting apparatus which may be directly mounted to or integrated into the casting dies or die blocks between the die cavity and a vacuum source.

It is an object of the present invention to provide a filter system which adequately filters the air and gases exiting the die cavity as well as provide a serpentine flow path through the filter system. The filter system is also compressible so that if overflow of molten material occurs, the filter system will collapse, prohibiting the molten material from entering into the vacuum source.

Further, the filter system enables removability of the system from the die casting or disconnection of an auxiliary filter system for easy and rapid cleaning of the filter element. Also, the filter systems are easily replaceable.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENTS

In general, the present invention is directed to an improved vacuum valve filter system which is operably installed in fluid communication between the die cavity and a remote vacuum source in a vacuum die casting apparatus. To this end, the present invention may be utilized on the vacuum valve disclosed in U.S. Pat. No. 5,101,882, copending U.S. Ser. No. 08/312,324, entitled "Die Cast Vacuum Valve", or Ser. No. 08/312,309, entitled "Die Cast Vacuum Valve", filed on even date with the present application, the entire disclosures of which are expressly incorporated herein by reference.

The vacuum valve filter system of the present invention provides a mechanism to filter fluid exiting the cavity as well as acting as a stop to prohibit molten material from entering the vacuum source. Thus, the present invention may be incorporated into a number of specific vacuum valve constructions in a vacuum die cast apparatus for the manufacture of die cast components. As used herein, the term fluid is used to encompass the flow through the vacuum valve filter system of both gases and liquids in the manner more specifically set forth herein.

Figure 1:
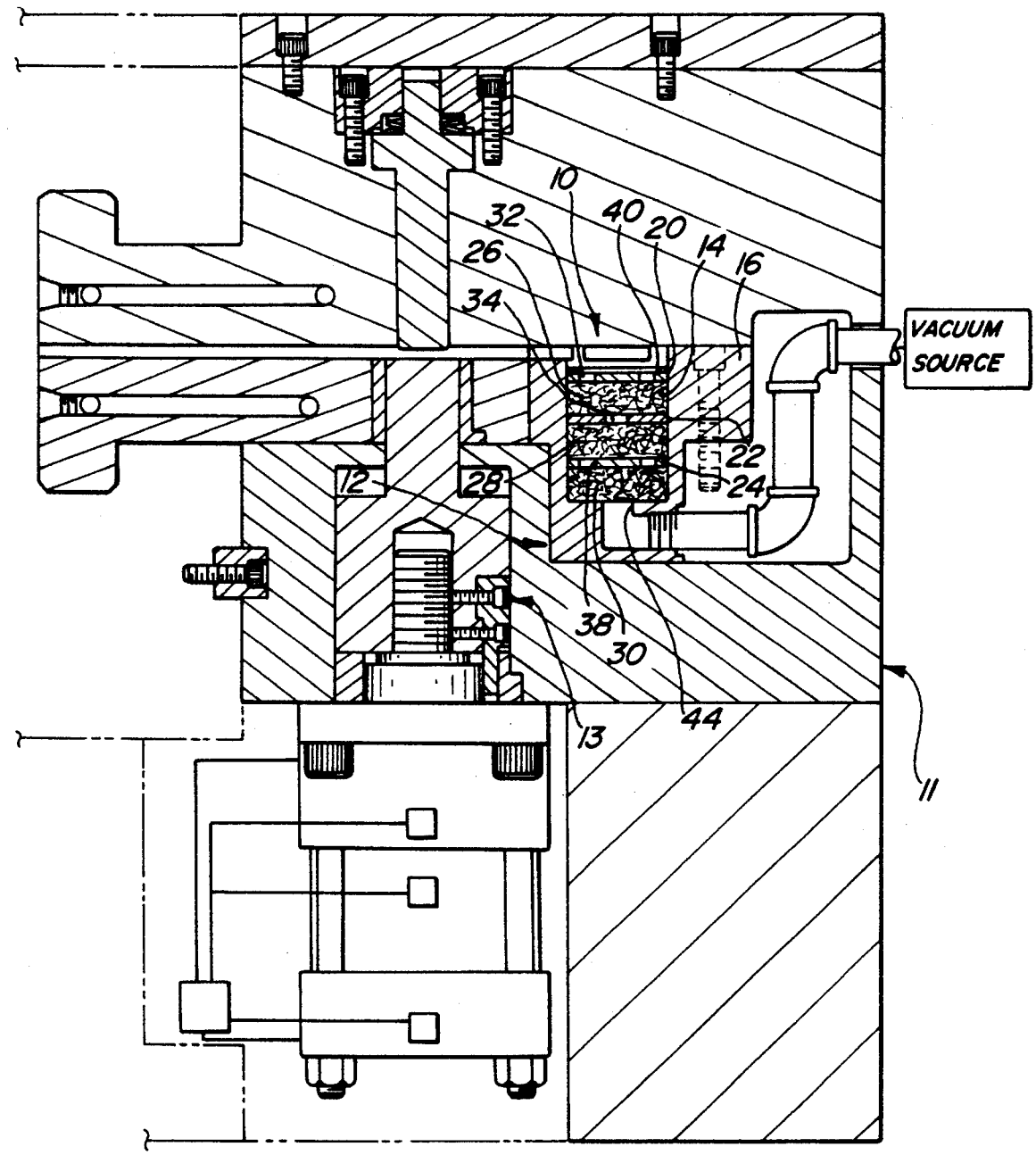
FIG. 1 is a cross sectional view of a vacuum valve with a filter system according to the present invention.

In reference to FIG. 1, a vacuum valve filter system 10 is shown in association with the ejector die 11 of a die set. The ejector die 11 includes a vacuum valve 13 and associated elements. A detailed explanation of the vacuum valve is in U.S. Ser. No. 08/312,324, entitled "Die Cast Vacuum Valve", filed on even date, the specification and drawings are expressly incorporated herein by reference.

The filter system 10 includes a casing 12 having a bore 14 and a plate portion 16. Plate portion 16 includes a plurality of apertures 17 enabling fasteners 19 to pass therethrough to retain the casing 12 on the ejector die block 11. Also, an overflow groove 18 is formed in the casing plate portion 16 to enhance stopping of an overflow of molten material into the filter system. Ejector pins 21 are likewise associated with the plate portion 16 to enhance removal.

Figure 2:
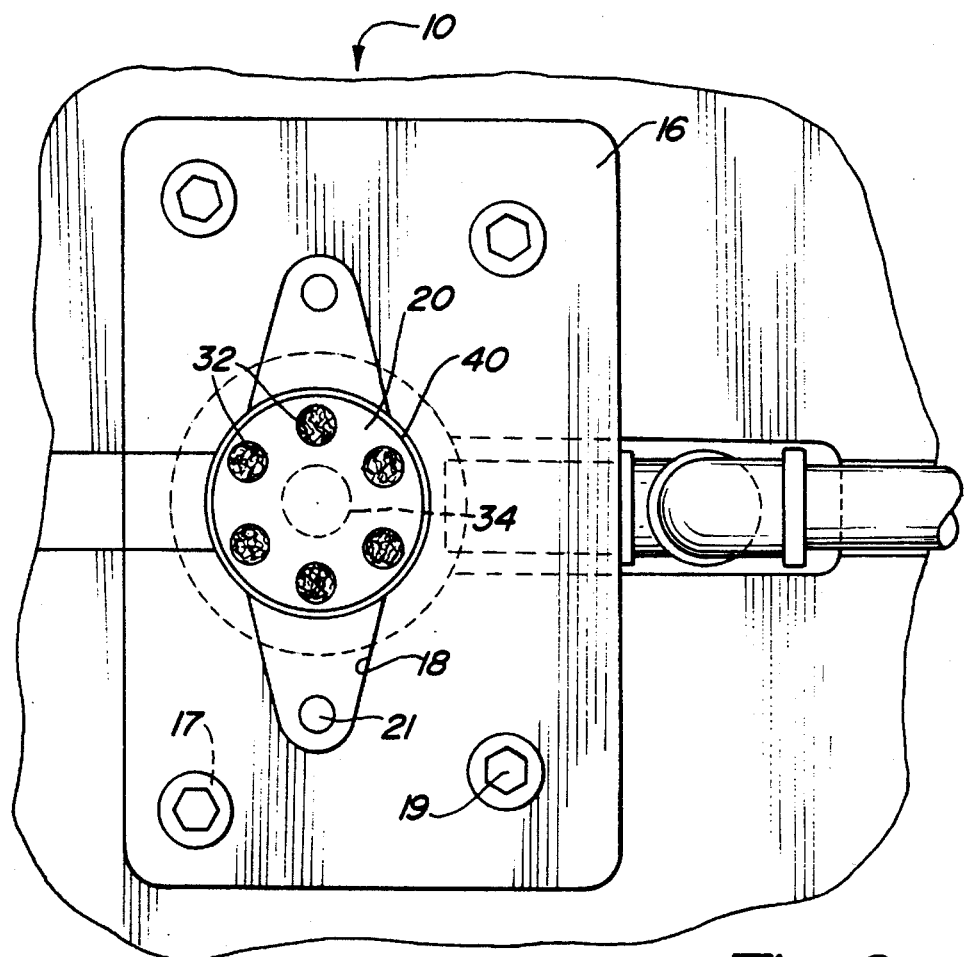
FIG. 2 is a top plan view of FIG. 1 along line 2—2 thereof.

Turning to the casing bore 14, a number of diverter elements 20, 22, 24 as well as filter elements 26, 28, 30 are positioned within the bore 14. The first diverter element 20 is disc shaped and has a plurality of apertures 32 circumferentially spaced from its center as seen in FIG. 2. The second diverter element 22 includes a central aperture 24 enabling flow of fluid into the filter system. The diverter second element 22 is a flat disk with a central aperture similar to that of a washer. Thus, as flow passes through the first diverter 20, the flow is converged towards the center of the filter 26 and passes through the central aperture 34 of the flow diverting element 22. The flow diverting element 24 is the same as that of element 20. Thus, as the flow passes out of the second diverting element 22, it diverges through the circumferential apertures 38 of the diverting element 24 and then through filter 30.

The filters 26, 28 and 30 are substantially identical. The filters are manufactured from a wire or metal mesh material with the mesh being wrapped spirally about its center. Thus, the filter is axially compressible along the axis of the casing bore. The filters 26, 28 and 30 are easily removed from the bore and are likewise easily cleaned and reconfigured for return to the casing 12.

The first diverting element 20 is positioned at the inlet end 40 of the bore 14 adjacent to a retaining ring 42 which retains the filters 26, 28 and 30 and diverting elements 20, 22 and 24 within the bore 14. The third filter 30 is positioned adjacent the outlet 44 of the casing which is in turn coupled with conduits 46 to draw the vacuum through the dies.

As seen in FIG. 1, the diverting elements 20, 22, 24 sandwich the filters 26, 28, 30 between the alternating diverter/filter configuration. Additional diverting elements and filters may be utilized with the even numbered diverting elements having a central aperture and the odd numbered diverters having circumferential apertures to provide the serpentine flow path through the filter system.

Figure 3:
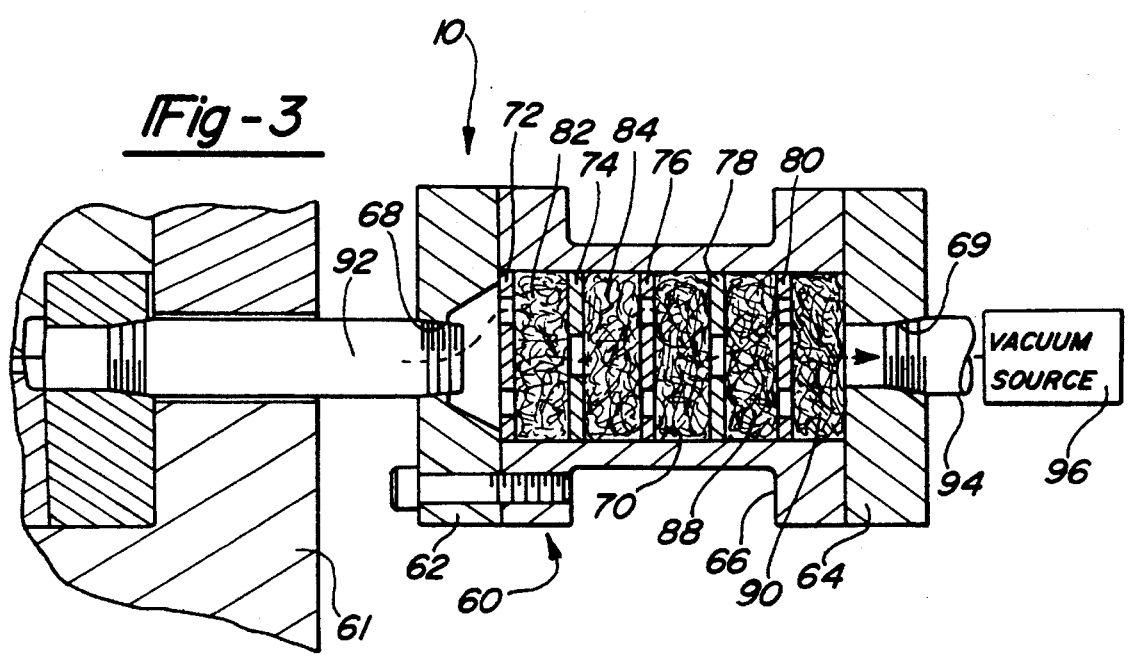
FIG. 3 is a partial cross sectional view of an alternate embodiment of the present invention.

Turning to FIG. 3, an additional embodiment of the filter system is shown. Here, the filter system 10 is shown exterior of the die ejector block 61. The filter system includes a casing 60 having a pair of caps 62 and 64 and a body 66. The cap 62 includes a bore 68 acting as an inlet into the filter system and likewise, cap 64 includes a bore 69 acting as an outlet for the system. The body 66 includes a central bore 70 which houses the diverter elements 72, 74, 76, 78, 80 and filter elements 82, 84, 86, 88, 90.

The diverter elements 72, 74, 76, 78 and 80 are like those previously described with the first, third and fifth elements 72, 76 and 80 having a plurality of circumferential apertures while the second 74 and fourth 78 elements have a central aperture. Thus, a serpentine flow path is established through the filter system from a converging/diverging/converging/diverging path from the diverter elements through the filters. Thus, the filter system 10 would work like that previously described. Also, a further number of filter diverter elements and filters could be utilized in the system.

Conduits 92 and 94 are utilized to connect the filter system 10 with the ejector die block 61 and the vacuum source 96, respectively.

While the above detailed description describes the preferred embodiment of the present invention, the invention is susceptible to modification, variation, and alteration without deviating from the scope and fair meaning of the subjoined claims.

What is claimed is:

1. A vacuum valve filter system comprising:

a casing defining a bore having an inlet and an outlet;

a first flow diverting element having a plurality of apertures, said first flow diverter positioned in said casing bore adjacent said inlet;

a first compressible filter element in said casing bore adjacent said first flow diverting element for accepting flow from said diverting element;

a second flow diverting element having at least one central aperture for enabling flow and positioned in said casing bore to sandwich said first filter element, said at least one central aperture aligned to be offset with respect to said plurality of apertures;

a second compressible filter element positioned in said casing bore adjacent said second flow diverting element for accepting flow from said diverting element;

a third flow diverting element having a plurality of apertures, said third flow diverting element positioned in said casing bore to sandwich said second filter element; and a third compressible filter element positioned in said casing bore adjacent said third flow diverting element for accepting flow from said flow diverting element and adjacent said casing outlet wherein upon entrance of molten metal, at least one of said filter elements compressing to prohibit flow of the molten material.

2. The filter system according to claim 1, wherein said filter elements are manufactured from compressible metallic mesh material.

3. The filter system according to claim 1, wherein flow apertures in said first, second and third diverters are positioned such that flow through said system is along a serpentine path.

4. The filter system according to claim 1, wherein said system includes additional diverting elements and filter elements, additional even diverting elements having at least one central aperture and odd diverting elements including a plurality of apertures offset with respect to the at least one central aperture.

5. The filter system according to claim 1, wherein said casing is adapted to fit into a vacuum valve die.

6. The filter system according to claim 1, wherein said casing is adapted to attach to a conduit extending from a vacuum valve die.

7. The filter system according to claim 1, wherein said diverting elements and filter elements are removable from said casing for cleaning.

* * * * *